United States Patent
Oda

(10) Patent No.: US 7,854,201 B2
(45) Date of Patent: Dec. 21, 2010

(54) IGNITER ASSEMBLY

(75) Inventor: Shingo Oda, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 1084 days.

(21) Appl. No.: 11/591,477

(22) Filed: Nov. 2, 2006

(65) Prior Publication Data
US 2007/0137512 A1    Jun. 21, 2007

Related U.S. Application Data

(60) Provisional application No. 60/735,848, filed on Nov. 14, 2005.

(30) Foreign Application Priority Data

Nov. 8, 2005    (JP) .............................. 2005-323132

(51) Int. Cl.
*F42B 3/10*    (2006.01)
(52) U.S. Cl. ............................ 102/202.14; 102/202.12; 102/202.9; 102/530; 280/741
(58) Field of Classification Search .............. 102/202.5, 102/202.6, 202.12, 202.14, 202.9, 530, 531; 280/741
See application file for complete search history.

(56) References Cited

U.S. PATENT DOCUMENTS

| 6,073,963 | A | 6/2000 | Hamilton et al. | |
|---|---|---|---|---|
| 7,111,558 | B2 * | 9/2006 | Brede et al. ............... | 102/202.9 |
| 7,296,823 | B2 * | 11/2007 | Nishina ...................... | 280/741 |
| 7,431,337 | B2 * | 10/2008 | Matsuda et al. ............. | 280/741 |
| 2007/0001439 | A1 * | 1/2007 | Matsuda et al. ............. | 280/741 |
| 2008/0022880 | A1 * | 1/2008 | Bierwirth et al. ............ | 102/530 |

FOREIGN PATENT DOCUMENTS

JP    11-321541 A    11/1999

* cited by examiner

*Primary Examiner*—James S Bergin
(74) *Attorney, Agent, or Firm*—Birch, Stewart, Kolasch & Birch, LLP

(57) ABSTRACT

An igniter assembly includes, an electric igniter and igniter collar, and a resin fixing the electric igniter into the igniter collar. The electric igniter has an igniter main body and a conductive pin which extends from the igniter main body. The igniter collar has a first through hole formed in the axial direction and at least one second through hole formed separately from the first through hole and being provided to the igniter collar. The electric igniter is fixed inside the first through hole by the resin, and the resin is also charged into the second through hole.

7 Claims, 4 Drawing Sheets

IGNITER ASSEMBLY

This nonprovisional application claims priority under 35 U.S.C. §119(a) on Patent Application No. 2005-323132 filed in Japan on 8 Nov. 2005, and 35 U.S.C. §119(e) on U.S. Provisional Application No. 60/73,5848 filed on 14 Nov. 2005, which are incorporated by reference.

BACKGROUND OF THE INVENTION

1. Field of Invention

The present invention relates to an igniter assembly for use in a gas generator and to an assembling method therefor.

2. Description of Related Art

Because of an advantage in cost thereof, a structure in which an igniter main body is integrated with an igniter collar by a resin is presently widely used in igniter assemblies. A resin or the like is used for integration and the assembling is performed by an injection molding method.

JP-A No. 11-321541 (U.S. Pat. No. 6,073,963) discloses an igniter assembly for use in a gas generator for an air bag. When an injection molding method is employed to assemble the igniter assembly, a molding die is used, but as shown in FIG. 1 and FIG. 2, the strength of the inward flange portion (inner section 80) of the collar has to be increased by increasing the thickness thereof so that the igniter main body does not slip through a hole formed in the collar (insertion member 40) when some force is applied to the igniter main body after the resin has been melted by the heat of an ignition agent during actuation after incorporation in a gas generator or the like.

However, if the thickness of the inward flange portion is increased, the space for inserting an injection mold into the collar is decreased and, for example, a gap is difficult to form between the collar and the injection molding mold located below the collar and the resin can hardly flow smoothly into the mold. In particular, in the case where only one resin injection port is provided (for example, only above the collar) to simplify the injection apparatus, the gap formed between the collar and mold is decreased, thereby impeding the flow of resin into the zone below the collar.

SUMMARY OF THE INVENTION

The present invention provides an igniter assembly including:
an electric igniter and igniter collar,
a resin fixing the electric igniter into the igniter collar,
the electric igniter having an igniter main body and a conductive pin which extends from the igniter main body,
a first through hole formed in the axial direction and one or two or more second through hole formed in the axial direction separately from the first through hole being provided to the igniter collar,
the electric igniter being fixed inside the first through hole by the resin, and the resin also being charged into the second through hole.

The present invention further provides an igniter assembly including:
two electric igniters and a single igniter collar,
a resin fixing the electric igniters into the igniter collar,
each of the two electric igniters having an igniter main body and a conductive pin which extends from the igniter main body,
two first through holes formed in the axial direction, one or two or more second through hole formed in the axial direction separately from the first through holes and a joining groove joining one end open sections of the two first through holes being provided to the igniter collar,
the electric igniter being fixed by the resin inside the first through holes, and the resin also being charged into the second through holes and the joining groove.

The present invention further provides an igniter assembly including:
an electric igniter and an igniter collar,
a resin fixing the electric igniter into the igniter collar,
the electric igniter having an igniter main body and a conductive pin which extends from the igniter main body,
a first through hole formed in the axial direction and one or two or more through groove formed in the axial direction along the inner periphery of the first through hole being provided to the igniter collar,
the electric igniter being fixed by the resin inside the first through hole and the resin being charged into the through groove.

The present invention further provides an igniter assembly including:
two electric igniters and a single igniter collar,
a resin fixing the electric igniters into the igniter collar,
each of two electric igniters having an igniter main body and a conductive pin which extends from the igniter main body,
two first through holes formed in the axial direction, one or two or more through groove formed in the axial direction along the inner periphery of the first through holes and a joining groove joining one end open sections of the two through holes, being provided to the igniter collar,
the electric igniter being fixed by the resin inside the first through holes and the resin being charged into the through grooves and the joining groove.

The present invention further provides a method for assembling the igniter assembly described above, including the steps of:
attaching the igniter collar and the electric igniter to a lower mold so that the electric igniter is positioned inside the first through hole of the igniter collar;
combining an upper mold having a resin charging port with the lower mold;
injecting a molten resin from the resin charging port of the upper mold via the second through hole or the through groove, charging the resin into a space formed by the lower mold, the upper mold, the igniter collar, and the electric igniter, solidifying the resin, and fixing the electric igniter inside the first through hole; and
demolding.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
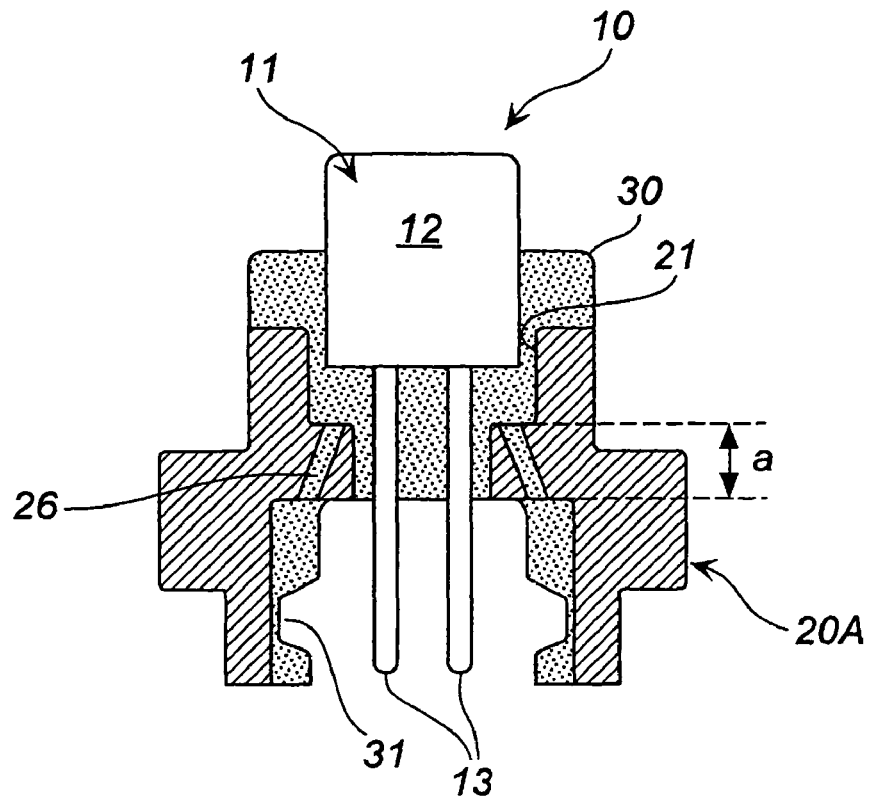
FIG. 1 shows an axial sectional view of the igniter assembly.

The present invention is to provide an igniter assembly in which an electric igniter is easily fixed into an igniter collar by resin, and a method for manufacturing the igniter assembly.

The igniter (electric igniter) is used as an initiation means of a passenger restraining device for an automobile, such as a gas generator for an airbag, and includes an igniter main body (includes an ignition agent, a bridge wire for igniting the ignition agent, a thin-film bridge, and a heat source such as a nichrome wire) and a conductive pin for supplying electric energy to the igniter main body, and is installed in a state of being fixed inside a metallic igniter collar with a resin.

When the igniter is fixed to the igniter collar, a method is employed including the steps of placing the igniter and igniter collar in a mold (combination of an upper mold and a lower mold), injecting a resin into the space formed between the metallic collar and igniter main body, and demolding.

When the resin is injected, the injection is easier when the space formed between the metallic collar and igniter main body is large. As a method for increasing this space, the igniter length can be increased or the igniter collar diameter can be increased, thereby increasing the gap formed between the igniter collar and the mold, but such method cannot be employed due to market requirements relating to size and weight decrease of the entire gas generator. Accordingly, reducing the thickness, without changing the length or diameter of the igniter collar can be considered, but such measure decreases the strength of the igniter collar itself.

Furthermore, from the standpoint of simplifying the injection operation, it is preferred that the injection port (a resin charging port provided in a mold) be provided in one place and the resin be charged from this port to spread everywhere inside the mold.

In the igniter assembly in accordance with the present invention, the igniter collar has a first through hole and a second through hole. The first through hole is an elongated space for arranging the igniter, and the second through hole acts so that the molten resin charged from the resin charging port during injection molding spreads to the end sections of the igniter collar. The end sections as referred to herein means all the portions of the igniter collar that are in positions far from the vicinity of the resin charging hole and are not limited to specific portion.

The first through hole is a through space when the igniter collar has a substantially cylindrical shape (the cross section in the width direction has a round, elliptical, or polygonal shape). The second through hole is a through hole formed in the axial direction in the thick section of the igniter collar; it is preferred that a plurality of second through holes be formed around the first through hole.

The second through hole may be formed in an annular flat plate section that protrudes inwardly from the inner surface of the igniter collar. To facilitate the charging of resin, it is preferred that the second through hole be formed in the axial direction parallel to the first through hole or at a similar angle thereto.

Because the igniter collar has a second through hole in the igniter assembly in accordance with the present invention, even if the gap through which the resin is to pass inside the first through hole is small (or no such gap is formed at all), the resin can spread in the entire space inside the mold via the second through hole. Therefore, the igniter collar and igniter can be fixed by tightening caused by shrinkage of the resin during solidification and the sealing performance can be improved.

Furthermore, because the resin is also charged into the second through hole, the resin is prevented from rotating inside the igniter collar. In addition, because the thickness of the annular flat plate section can be maintained, even when the pressure inside the gas generator is increased acting to throw the igniter out of the igniter collar, the structure can withstand this force and prevent the igniter from flying out.

In the igniter assembly of this invention, two igniters are arranged inside two first through holes and a groove (joining groove) is provided for joining together the open sections at one end of the two first through holes.

The joining groove is in the position corresponding to (preferably, exactly opposite) the resin charging hole of the mold used during the injection. Furthermore, it is preferred that the resin charged from the resin charging port be injected in the vicinity of the intermediate position of the joining groove. With such configuration, the resin can be charged uniformly into the two first through holes. Therefore, a uniform resin temperature and shrinking degree during solidification can be obtained.

The present invention preferably provides the igniter assembly, wherein the first through hole has three spaces of different inner diameters, the three spaces are a first larger-diameter section space at one end, a second larger-diameter section space at the other end where the conductive pin is positioned, and an intermediate smaller-diameter section space, and the second through hole links the first larger-diameter section space and the second larger-diameter section space.

The smaller-diameter section space is a space with a diameter less than that of the first and second larger-diameter section spaces, for example, a space having an annular flat plate section provided to protrude inwardly from the inner surface of the igniter collar. If such annular flat plate section is covered with a resin, then the annular flat plate section will be pressed from both sides in the thickness direction due to shrinkage during resin solidification. As a result the sealing ability will be improved.

Because the inner diameter of the smaller-diameter section space is less than the outer diameter (length in the width direction) of the igniter main body, the igniter can be prevented from flying out toward the second larger-diameter section. The second through hole can be formed through the annular flat plate section.

The first larger-diameter section space is a space where the igniter main body is positioned and the inner diameter thereof is determined by the relationship with the size of the igniter main body. The second larger-diameter section space is a space where the conductive pin is positioned and this space serves to insert the connector. Therefore, the inner diameter of this space is determined by the relationship with the size of the connector.

The igniter assembly of this invention is identical to that of the invention of claim 1, except that a through groove is provided instead of the second through hole. The through groove acts to spread the molten resin, that was charged through the resin charging port during injection molding, everywhere inside the mold.

The through groove is formed in the inner surface of the igniter collar along the inner periphery of the first through hole. The through groove can be formed in the axial direction from one end of the igniter collar to the other end thereof, but may be formed at least to a length sufficient for the resin injected form one end of the igniter collar to move to the other end. It is preferred that a plurality of through grooves with equidistantly spaced in the circumferential direction be formed.

The igniter assembly of this invention is identical to that of the invention of claim 4, except that two igniters are arranged inside two first through holes and that the igniter assembly has a groove (joining groove) that joins the open sections at one end of two or more first through holes.

The joining groove is in a position corresponding to (preferably, exactly opposite) the resin charging hole of the mold used during the injection. Furthermore, it is preferred that the resin charged from the resin charging port be injected in the vicinity of the intermediate section of the joining groove. With such configuration the resin can be charged uniformly into the two first through holes. Therefore, a uniform resin temperature and shrinking degree during solidification can be obtained.

The present invention preferably provides the igniter assembly, wherein the first through hole has three spaces of different inner diameters, the three spaces are a first larger-diameter section space at one end, a second larger-diameter section space at the other end where the conductive pin is positioned, and an intermediate smaller-diameter section space, and the through groove is formed to extend between the first larger-diameter section space and the second larger-diameter section space.

The smaller-diameter section space is a space with a diameter less than that of the first and second larger-diameter section space, for example, a space having an annular flat plate section provided to protrude inwardly from the inner surface of the igniter collar. If such annular flat plate section is covered with a resin, then the annular flat plate section will be pressed from both sides in the thickness direction due to shrinkage during resin solidification. As a result, the sealing ability will be improved.

Because the inner diameter of the smaller-diameter section space is less than the outer diameter (length in the width direction) of the igniter main body, the igniter can be prevented from flying out toward the second larger-diameter section. The through groove can be formed through the annular flat plate section.

The present invention preferably provides the igniter assembly, wherein the second larger-diameter section space is a space for inserting a connector, and a side surface covered with the resin has a concave section of the shape corresponding to the protrusion of the connector.

The convex section for mating with the protrusion of the connector is provided to prevent the connector from falling off after the connector has been connected to the igniter collar. If the second larger-diameter section space of the igniter collar is formed by metal only, the concave section (groove) is difficult to process. However, because the resin facilities the formation of the concave section (groove) in a molding die, the surface of the second larger-diameter section space is covered with a resin and the concave section is formed.

In the method for assembling the igniter assembly in accordance with the present invention, a collar having a second through hole or a through groove is used as an igniter collar. Therefor, if a molten resin is injection charged from the resin charging port provided in the mold, the molten resin will penetrate into the space formed by the mold, igniter collar, and igniter. In this process, the molten resin will also move through the second through hole or through groove. Therefore, the molten resin can be spread over the entire inside of the space and quality can be improved.

With the method for assembling according to the present invention, an improved igniter assembly having good sealing properties can be obtained.

EMBODIMENTS OF THE INVENTION (1) Igniter Assembly of FIG. 1

Figure 2:
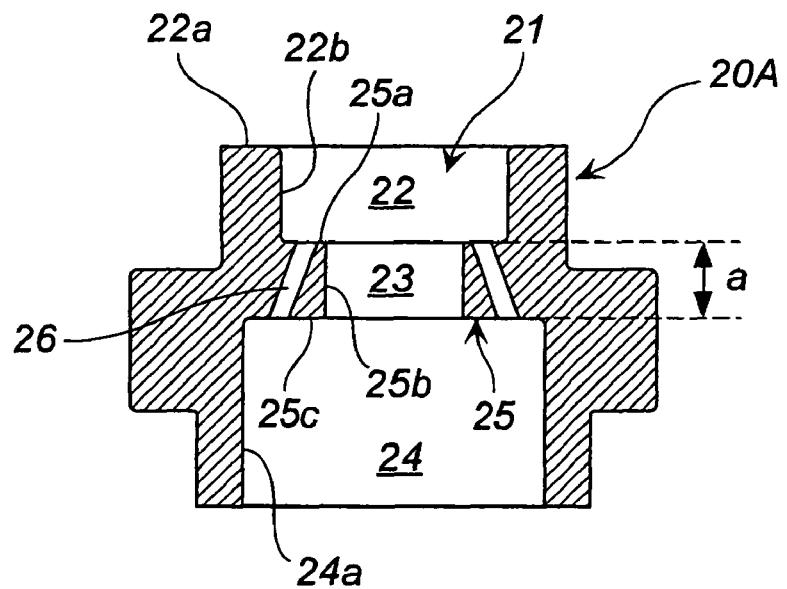
FIG. 2 shows an axial sectional view of the igniter collar used in the igniter assembly of FIG. 1.

FIG. 1 is an axial sectional view of an igniter assembly. FIG. 2 is an axial sectional view of the igniter collar used in the igniter assembly of FIG. 1.

In an igniter assembly 10 shown in FIG. 1, a single electric igniter 11 is integrated with a single metallic igniter collar 20A by a resin 30.

The igniter 11 has an igniter main body 12 and a pair of conductive pins 13 extending from the igniter main body 12. The conductive pins 13 are held in an electrically insulated state, and a bridge wire (not shown in the drawing) is laid across inside the igniter main body. An ignition agent present inside the igniter main body 12 is brought into contact with the bridge wire, this ignition agent is ignited and combusted by the heat generated by the bridge wire and generates flame necessary to initiate the operation of a gas generator.

The metallic igniter collar 20A has a substantially cylindrical shape and has a first through hole 21 for inserting and attaching the electric igniter 11 therein.

The first through hole 21 has three spaces of different inner diameter. The three spaces include a first larger-diameter section space 22 located at one end where the igniter main body 12 is positioned, a smaller-diameter section space in the intermediate position, and a second larger-diameter section space 24 located at the other end where the conductive pins 13 are positioned.

A smaller-diameter section space 23 is formed by an annular flat plate section 25 protruding inwardly from the inner surface of the igniter collar 20A. Two second through holes 26 arranged with equal intervals in the circumferential direction are formed in the annular flat plate section 25 so as to pass therethrough in the axial direction. The first larger-diameter section space 22 and second larger-diameter section space 24 are linked together by those second through holes 26.

The inner diameter of the smaller-diameter section space 23 is less than the outer diameter of the igniter main body 12. As a result, even if a pressure is applied from the igniter main body 12 when the resin 30 is melted by the combustion heat of the ignition agent during actuation (or combustion heat of a gas generating agent when such is incorporated in the gas generator), the igniter 11 does not fly out (pulled downward in FIG. 1). Furthermore, as shown in FIG. 1, the axial thickness (shown by symbol a) of the annular flat plate section 25 is sufficiently large and this section has a strength sufficient to prevent the igniter 11 from flying out.

The resin 30 is loaded into the space formed by the first larger-diameter section space 22, smaller-diameter section space 23, and electric igniter 11, and part of the igniter main body 12 outside of this space is also enveloped by the resin 30. The second larger-diameter section space 24 serves to insert a connector, and only a portion close to the inner surface thereof is covered with the resin 30. This space has an annular concave section (groove) 31 for inserting the protrusion of the connector.

Thus, because a top surface 22a and a circumferential surface 22b of the circumferential wall forming the first larger-diameter section space 22, an upper surface 25a, a circumferential surface 25b, and a lower surface 25c of the annular flat plate section 25 forming the smaller-diameter sections space 23, the second through holes 26, and a circumferential surface 24a forming the second larger-diameter section space 24 are covered with the resin 30, the annular flat plate section 25 is squeezed in the thickness direction by the resin 30 due to molding shrinkage or post-shrinkage of the resin 30, thereby ensuring the reliable joining of the igniter collar 20A and resin 30.

The formation of a gap between the surfaces of the igniter collar 20A and resin 30 is thus prevented and sealing capacity is improved. As a result, the permeation of moist air from the external atmosphere is prevented.

The resin 30 preferably has low water absorptivity and a small linear expansion coefficient. In the igniter assembly of the present embodiment, a resin obtained by charging 33% of glass filler into Nylon 6-12 (molding shrinkage ratio in the flow direction: 0.2%, molding shrinkage ratio in the perpendicular direction: 0.3%, linear expansion coefficient: $2.3 \times 10-5$ cm/cm° C.) is preferably used. Such resin has a molding shrinkage ratio advantageous for squeezing the annular flat plate section 25 from below and above and enables the suppression of deformation or warping after molding.

(2) Method for Assembling the Igniter Assembly of FIG. 1

Figure 3:
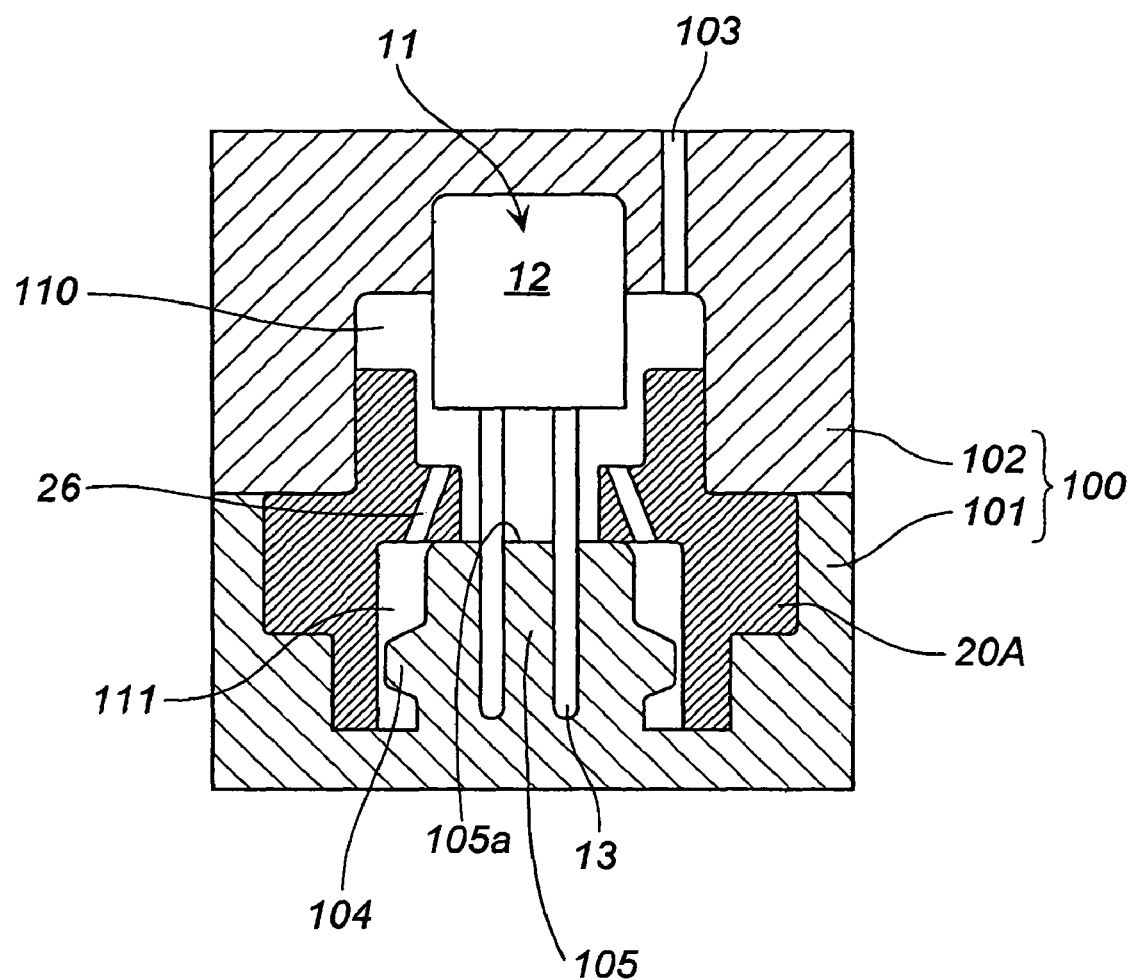
FIG. 3 shows a method for assembling the igniter assembly of FIG. 1.

A method for assembling the igniter assembly of FIG. 1 will be explained with reference to FIG. 3. A combination of a lower mold 101 and an upper mold 102 is used as an injection mold 100.

The lower mold 101 has a concave section corresponding to the outer shape of the igniter collar 20A and has a central convex section 105 of a round columnar shape. A plurality of movable cams 104 are formed on the circumferential surface of the central convex section 105. Under the effect of air pressure, the movable cams 104 can be pulled inside to be flush with the circumferential wall surface of the central convex section 105 and can protrude from the circumferential wall surface.

First, the electric igniter 11 and igniter collar 20A are mounted on the lower mold 101. The igniter collar 20A is fitted in the predetermined concave section, and the conductive pins 13 are inserted in conductive pin receptacle holes formed in the lower mold 101. At this time, the top surface 105a of the central convex section 105 of the lower mold 101 comes into contact with part of the lower surface 25c of the annular flat plate section 25 of the igniter collar 20A, or a small gap not allowing penetration of the molten resin is formed therebetween.

Then, the upper mold 102 having a concave section corresponding to the igniter collar 20A and igniter main body 12 is placed on the lower mold 101. Placing the upper mold 102 on the lower mold 101 produces a state in which the igniter 11 and igniter collar 20A are fixed inside the injection mold 100. A resin charging port 103 is formed in the upper mold 102.

A molten resin is then injected from the resin charging port 103 of the upper mold 102 into the space formed inside the injection mold 100 and solidified.

The molten resin injected from the resin charging port 103 fills a space 110 formed by the upper mold 102, igniter collar 20A, and central convex section 105 of the lower mold 101 and also fills a space 111 formed by the lower mold 101 and igniter collar 20A by passing through the second through holes 26. Thus, even when the resin is charged via a single resin charging port 103, the entire space inside the injection mold 100 including the second through holes 26 is filled due to the action of the second through holes 26, while maintaining the thickness of the annular flat plate section 25 of the igniter collar 20A (the thickness shown by symbol a in FIG. 1). When the resin is injected, the movable cams 104 protrude from the circumferential wall surface of the central convex section 105.

The demolding is then performed and the igniter assembly is removed therefrom. The igniter assembly 10 shown in FIG. 1 can be obtained by, first, removing the upper mold 102 and then removing the lower mold 101 in a state where the movable cams 104 are pulled in.

Figure 4:
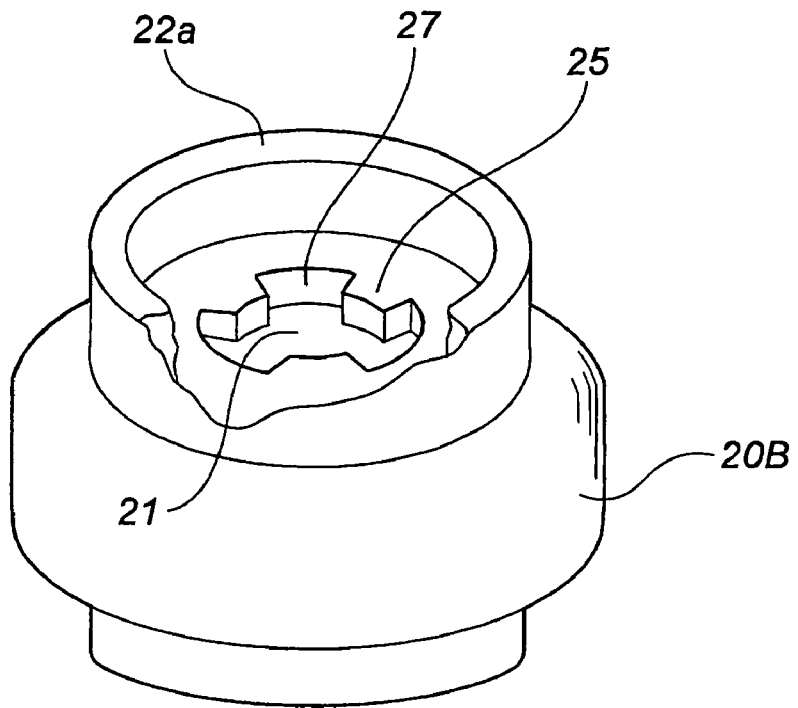
FIG. 4 shows a perspective view of the igniter collar of another embodiment.

(3) Igniter Assembly Using the Igniter Collar of FIG. 4

FIG. 4 is a perspective view of an igniter collar 20B in which part of the wall surface is cut out to view the entire first through hole 21. The igniter collar 20B of FIG. 4 differs from the igniter collar 20A of FIG. 2 in that it has through grooves 27 instead of the second through holes 26.

Through grooves 27 that are formed with equal intervals in three places are formed on the inner periphery of the first through hole 21. Through grooves 27 are formed by cutting out part of the annular flat plate section 25 surrounding the smaller-diameter section space 23 shown in FIG. 2. If the through grooves 27 are formed instead of second through holes 26, they can be formed by one operation together with the first through hole 21. Therefore, the process of manufacturing the igniter collar 20 can be simplified. The resin 30 is also charged into the through grooves 27.

Figure 5:
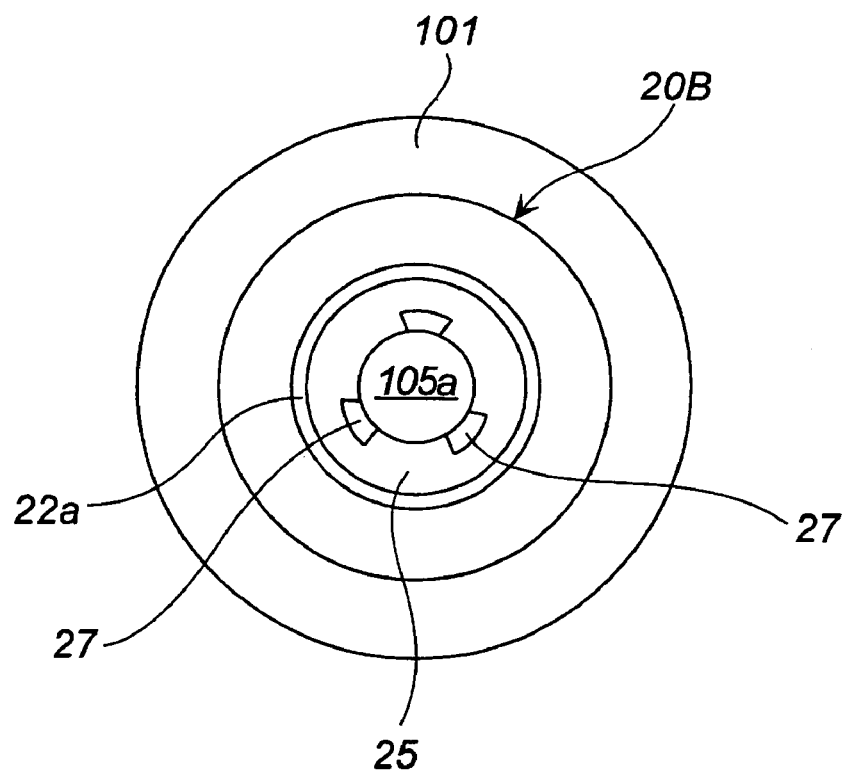
FIG. 5 shows an explanatory drawing of a method for assembling the igniter assembly using the igniter collar of FIG. 4.

A method for assembling the igniter assembly using the igniter collar 20B of FIG. 4 will be explained below with reference to FIG. 5. FIG. 5 is a plan view illustrating a state in which the upper mold 102 and igniter 11 were removed in the state shown in FIG. 3.

The top surface 105a of the central convex section 105 of the lower mold 101 abuts against the lower surface (25c in FIG. 2) of the annular flat plate section 25 of the igniter collar 20B. At this time, the first through hole 21 is closed with the top surface 105a, but the three through grooves 27 are open. Therefore, the action similar to that of the second through holes 26 shown in FIG. 1 can be performed and the space 111 shown in FIG. 3 is also filled with the resin.

Figure 6:
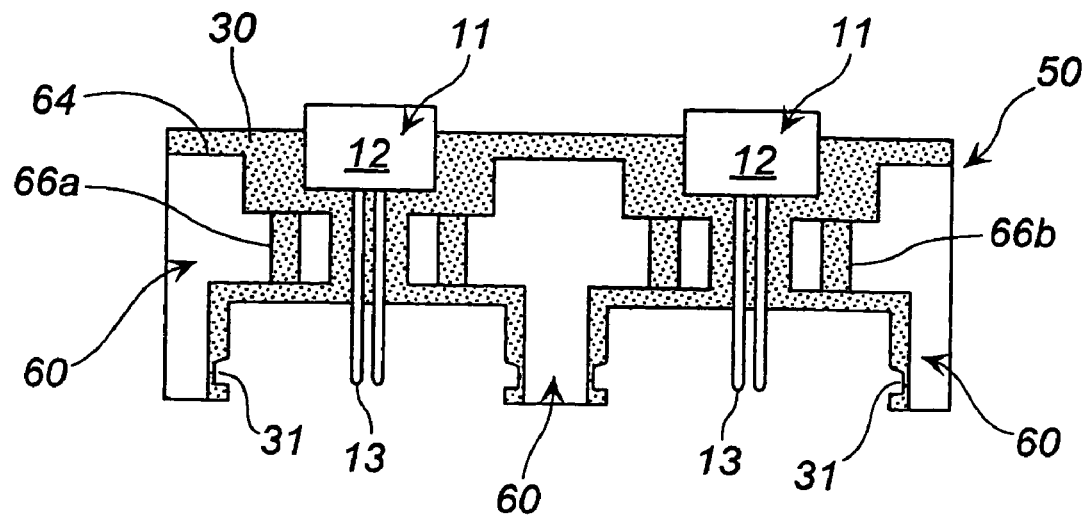
FIG. 6 shows an axial sectional view of the igniter assembly of another embodiment.

(4) Igniter Assembly of FIG. 6

Figure 7:
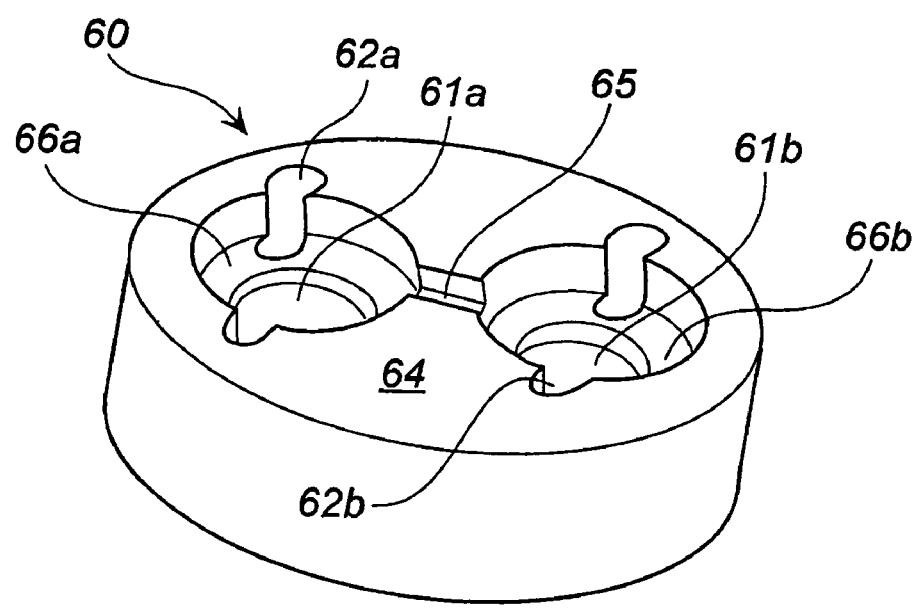
FIG. 7 shows a perspective view of the igniter collar used in FIG. 6.

FIG. 6 is an axial sectional view of the igniter assembly of another embodiment. FIG. 7 is a perspective view in the axial direction of the igniter collar used in FIG. 6. In FIG. 6 the components assigned with the same reference numerals as components in FIG. 1 are identical to those components.

In an igniter assembly 50 shown in FIG. 6, two electric igniters 11 are integrated with a single metallic igniter collar 60 by a resin 30.

As shown in FIG. 7, the metallic igniter collar 60 has two first through holes 61a, 61b formed in the axial direction. The two first through holes 61a, 61b have the same shape and structure.

The inner shape and structure of the two first through holes 61a, 61b are identical to those of the igniter collar 20A shown in FIG. 2, and a plurality of second through holes 62a, 62b are provided around each first through hole.

Thus, each first through holes 61a, 61b has three spaces of different inner diameter. The three spaces include a first larger-diameter section space located at one end where the igniter main body 12 is positioned, a smaller-diameter section space in the intermediate position, and a second larger-diameter section space located at the other end where the conductive pins 13 are positioned. The smaller-diameter section space is formed by annular flat plate sections 66a, 66b protruding inwardly from the inner surface of the igniter collar 60. Two second through holes 62a, 62b are formed in the annular flat plate sections 66a, 66b, respectively. The first larger-diameter section space and second larger-diameter section space are linked together by those through holes. The second through holes 62a, 62b are formed similarly to the second through holes 26 as shown in FIG. 2.

The open sections at one end of the two first through holes 61a, 61b are joined by a joining groove 65 formed on the top surface 64.

In the igniter assembly 50 of FIG. 6, the resin 30 is charged into the igniter collar 60 in the same manner as in the igniter assembly 10 of FIG. 1. Therefore, the annular flat plate sections 66a, 66b are sandwiched in the thickness direction by the resin 30 due to the molding shrinkage or post-shrinkage of the resin 30 after the charging, whereby the igniter collar 60 and resin 30 are reliably joined together.

A method for assembling the igniter assembly 50 of FIG. 6 will be explained below. A combination of the lower mold and upper mold shown in FIG. 3 is used as an injection mold.

First, the electric igniter 11 and igniter collar 60 are mounted on the lower mold. The igniter collar 60 is fitted in the predetermined concave section, and the conductive pins 13 are inserted in conductive pin receptacle holes formed in the lower mold.

Then, the upper mold having a concave section corresponding to the igniter collar 60 and igniter main body 12 is placed on the lower mold. Placing the upper mold on the lower mold produces a state in which the igniter 11 and igniter collar 60 are fixed inside the injection mold. A resin charging port is formed in the upper mold.

A molten resin is then injected, from the resin charging port of the upper mold, in the vicinity of the intermediate position in the lengthwise direction of the joining groove 65. By injecting the resin in such a manner, the molten resin is uniformly injected into both the first through hole 61a and the first through hole 61b. Since the molten resin can be uniformly injected into the two first through holes 61a, 61b, a uniform resin temperature and shrinking degree during solidification can be obtained.

The molten resin injected from the resin charging port fills a space defined by the upper mold, igniter collar 60, and central convex section of the lower mold and also fills a space surrounded by the lower mold and igniter collar 60 by passing through the second through holes 62a, 62b (state shown in FIG. 5). Thus, even when the resin is charged via a single resin charging port, the entire space inside the injection mold, including the second through holes 62a, 62b, is filled due to the action of the joining groove 65 and second through holes 62a, 62b, while maintaining the thickness of the annular flat plate sections 66a, 66b in the axial direction.

The igniter assembly 50 shown in FIG. 6 can then be obtained by performing demolding and removing the igniter assembly.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An igniter assembly, comprising:
an electric igniter having an igniter main body and a conductive pin extending from the igniter main body;
an igniter collar having an annular flat plate section protruding inwardly from an inner surface thereof; and
a resin fixing the electric igniter to the igniter collar,
wherein the igniter collar has,
a first through hole extending through the igniter collar including the annular flat plate section, and
a through groove formed in an inner peripheral surface of the annular flat plate section, and
wherein the electric igniter is fixed to the igniter collar by the resin inside the first through hole including the resin charged through through groove.

2. The igniter assembly according to claim 1, wherein the first through hole of the igniter collar defines,
a first larger-diameter section space at one end of the igniter collar,
a second larger-diameter section space at an end of the igniter collar, opposite to the one end, where the conductive pin is positioned, and
an intermediate smaller-diameter section space between the first larger-diameter section space and the second larger-diameter section space, and
wherein the through groove is formed to extend between the first larger-diameter section space and the second larger-diameter section space.

3. The igniter assembly according to claim 2, wherein the second larger-diameter section space is a space for inserting a connector, and a side surface covered with the resin has a concave section of the shape corresponding to a protrusion extending from the connector.

4. The igniter assembly according to claim 1, wherein the igniter collar has a plurality of through grooves.

5. The igniter assembly according to claim 1, wherein the through groove has a fan-shape.

6. An igniter assembly, comprising:
an electric igniter having an igniter main body and a conductive pin extending from the igniter main body;
an igniter collar having an annular flat plate section protruding inwardly from an inner surface thereof; and
a resin fixing the electric igniter to the igniter collar,
wherein the igniter collar has,
a first through hole extending through the igniter collar including the annular flat plate section, and
a passage formed in the annular flat plate section, and
wherein the electric igniter is fixed to the igniter collar by the resin inside the first through hole including the resin charged through the passage.

7. The igniter assembly according to claim 6, wherein the passage is a through groove formed in an inner peripheral surface of the annular flat plate section.

* * * * *